United States Patent
Kumar et al.

(10) Patent No.: US 11,682,016 B2
(45) Date of Patent: Jun. 20, 2023

(54) SYSTEM TO PERFORM IDENTITY VERIFICATION

(71) Applicant: MASTERCARD INTERNATIONAL INCORPORATED, Purchase, NY (US)

(72) Inventors: Manish Kumar, Gurgaon (IN); Nishant Maheshwari, New Delhi (IN); Shuvam Sengupta, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 224 days.

(21) Appl. No.: 16/194,223

(22) Filed: Nov. 16, 2018

(65) Prior Publication Data
US 2019/0164162 A1 May 30, 2019

(30) Foreign Application Priority Data
Nov. 30, 2017 (SG) .......................... 10201709957U

(51) Int. Cl.
*G06Q 20/40* (2012.01)
*G06Q 20/32* (2012.01)
*G06Q 20/38* (2012.01)

(52) U.S. Cl.
CPC ..... *G06Q 20/4014* (2013.01); *G06Q 20/3227* (2013.01); *G06Q 20/3821* (2013.01)

(58) Field of Classification Search
None
See application file for complete search history.

(56) References Cited

U.S. PATENT DOCUMENTS 9,390,415 B2 * 7/2016 Hanson .............. G06Q 20/3226
9,621,355 B1 * 4/2017 Ochmanski .......... H04L 63/083
(Continued)

FOREIGN PATENT DOCUMENTS

WO   WO-2008037062 A1 * 4/2008 ............... G07C 9/23
WO   WO-2017123771 A1 * 7/2017 ........... G06Q 20/047

OTHER PUBLICATIONS

Christi, W., "Corporate Surveillance in Everyday Life", A Report by Cracked Labs, Jun. 2017. (Year: 2017).*
(Continued)

*Primary Examiner* — Neha Patel
*Assistant Examiner* — Clay C Lee
(74) *Attorney, Agent, or Firm* — Barta, Jones & Foley, PLLC

(57) ABSTRACT

According to a first aspect, there is provided an identity verifier comprising: at least one processor; at least one memory including computer program code; and a communication port coupled to the processor the at least one memory and the computer program code configured to, with the at least one processor, cause the identity verifier at least to: receive, through the communication port, query information to verify an identity provided by a party requesting a financial service; extract a unique identifier of an electronic device from the query information, the electronic device used to request the financial service; calculate a probability of an accuracy of the identity verification by at least determining whether one or more databases contain a record of the unique identifier, the one or more databases storing data used to perform the identity verification; and respond, through the communication port, to the query with the calculated probability.

20 Claims, 7 Drawing Sheets

(56) References Cited

U.S. PATENT DOCUMENTS

| | | | | |
|---|---|---|---|---|
| 9,680,868 | B2* | 6/2017 | Bailey | H04L 63/1466 |
| 10,510,082 | B1* | 12/2019 | Zimmerman | G06Q 20/108 |
| 2002/0120846 | A1* | 8/2002 | Stewart | G06Q 30/04 |
| | | | | 713/168 |
| 2009/0300168 | A1* | 12/2009 | Guo | G06F 21/73 |
| | | | | 709/224 |
| 2011/0041170 | A1* | 2/2011 | Wankmueller | G07F 19/00 |
| | | | | 715/764 |
| 2011/0184860 | A1* | 7/2011 | Bishop | G06F 21/31 |
| | | | | 705/39 |
| 2012/0023567 | A1* | 1/2012 | Hammad | G06Q 20/4016 |
| | | | | 726/9 |
| 2013/0305335 | A1* | 11/2013 | Syed | G06Q 20/40 |
| | | | | 726/7 |
| 2014/0172708 | A1* | 6/2014 | Chrapko | G06F 16/951 |
| | | | | 705/44 |
| 2015/0089568 | A1* | 3/2015 | Sprague | H04L 63/0853 |
| | | | | 726/1 |
| 2015/0142564 | A1* | 5/2015 | Lissack | H04L 67/535 |
| | | | | 709/227 |
| 2017/0188232 | A1* | 6/2017 | Raleigh | H04W 12/0605 |

OTHER PUBLICATIONS

Reese, S., Examination Report, Indian Patent Application No. 201814037557, dated Jul. 7, 2020, 7 pages.

\* cited by examiner

SYSTEM TO PERFORM IDENTITY VERIFICATION

CROSS REFERENCE TO RELATED APPLICATION

This application claims priority to Singapore Application No. 10201709957U, filed Nov. 30, 2017, entitled "SYSTEM TO PERFORM IDENTITY VERIFICATION", the entirety of which is incorporated herein by reference.

TECHNICAL FIELD

The following discloses a device and method to perform identity verification, for example before approval is given for a requested financial service.

BACKGROUND

Card or loan applications are made through completing an application form and submission of supporting documents which are verified at a later stage. Credit history and other eligibility criteria are verified by the credit card issuer. If a fraudster creates a synthetic identity by stealing the personal documents of another person and applies for a card/loan, it is difficult to tag such applications as fraudulent which result in huge write-offs for credit card companies.

There is thus a need to address the above shortcoming. Other desirable features and characteristics will become apparent from the subsequent detailed description and the appended claims, taken in conjunction with the accompanying drawings and this background of the present disclosure.

SUMMARY OF THE INVENTION

According to a first aspect, there is provided an identity verifier comprising: at least one processor; at least one memory including computer program code; and a communication port coupled to the processor the at least one memory and the computer program code configured to, with the at least one processor, cause the identity verifier at least to: receive, through the communication port, query information to verify an identity provided by a party requesting a financial service; extract a unique identifier of an electronic device from the query information, the electronic device used to request the financial service; calculate a probability of an accuracy of the identity verification by at least determining whether one or more databases contain a record of the unique identifier, the one or more databases storing data used to perform the identity verification; and respond, through the communication port, to the query with the calculated probability.

According to a second aspect, there is provided an identity verifier comprising: at least one processor; at least one memory including computer program code; and a communication port coupled to the processor the at least one memory and the computer program code configured to, with the at least one processor, cause the identity verifier at least to: receive, through the communication port, query information to verify an identity provided by a party requesting a financial service; determine a funds account linked to the received identity from the query information; verify a payment event that results in occurrence of a cash flow transaction with the linked funds account; and reply, through the communication port, to the query with data based on the verification of the payment event.

According to a third aspect, there is provided an identity verification method comprising receiving, query information to verify an identity provided by a party requesting a financial service; extracting a unique identifier of an electronic device from the query information, the electronic device used to request the financial service; calculating a probability of an accuracy of the identity verification by at least determining whether one or more databases contain a record of the unique identifier, the one or more databases storing data used to perform the identity verification; and responding to the query with the calculated probability.

According to a fourth aspect, there is provided an identity verification method comprising receiving query information to verify an identity provided by a party requesting a financial service; determining a funds account linked to the received identity from the query information; verifying a payment event that results in occurrence of a cash flow transaction with the linked funds account; and replying to the query with data based on the verification of the payment event.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the invention are described hereinafter with reference to the following drawings, in which.

DETAILED DESCRIPTION

Overview

Figure 1:
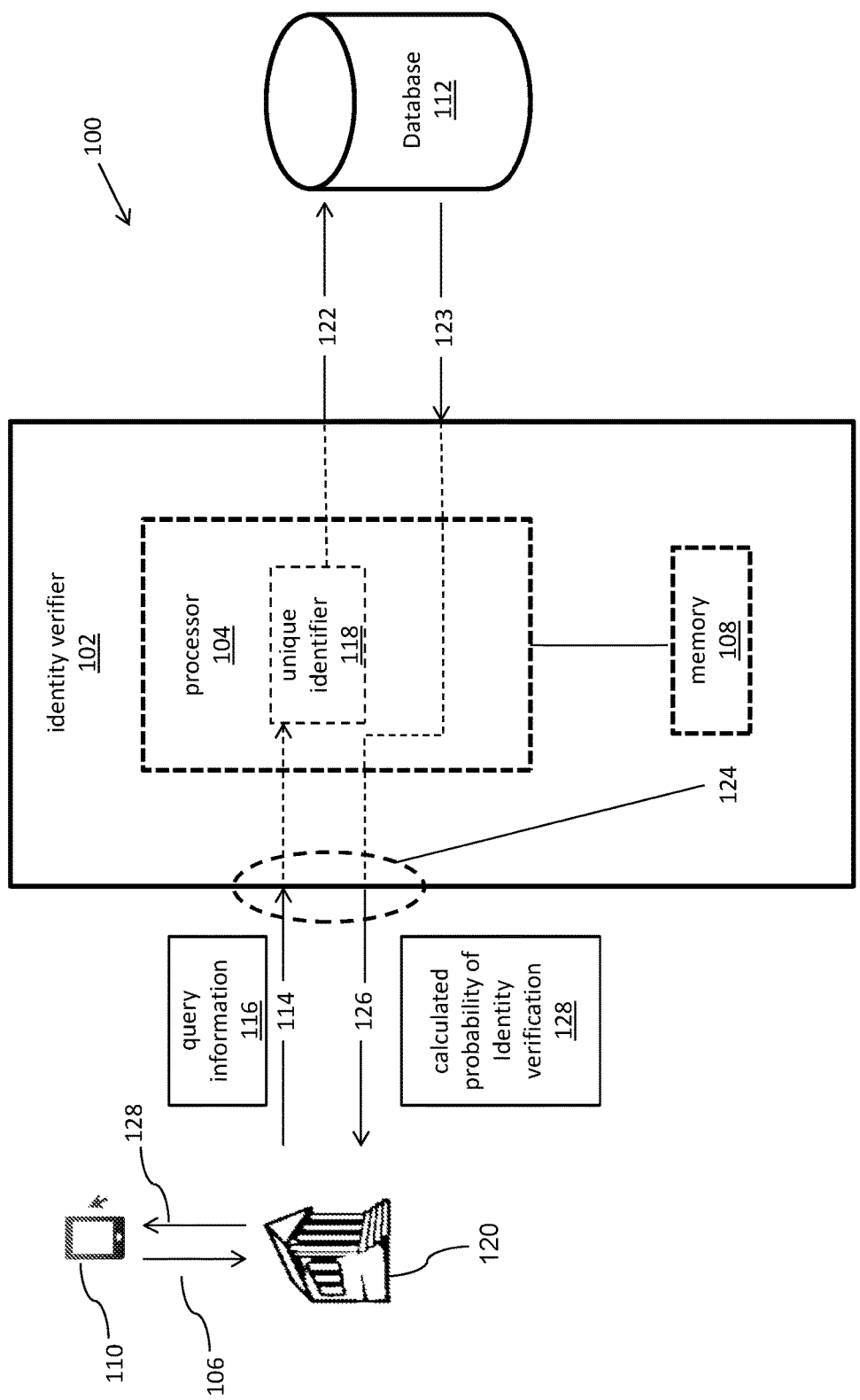
FIG. 1 shows a schematic of a system which may be used to perform identity verification, in accordance with a first approach, of a party requesting a financial service.

Various embodiments of present disclosure provide a method and a system that provides means to verify an identity of a party requesting a financial service, i.e. the following disclosure describes approaches to ascertain that the party is indeed who they claim to be. This verification is obtained before the financial service is provided and is facilitated by a computing device called an identity verifier, which may be realised by one or more server computers.

In a first approach, the identity verifier performs such verification by ascertaining whether the electronic device used by a party to request for the financial service is authenticated. This authentication is performed by determining the unique identifier of the party's electronic device. This unique identifier refers to any data that allows the party's electronic device to be differentiated from other electronic devices. The identity verifier then matches the determined unique identifier against records of one or more databases that the financial service provider has permission to access, where these databases store data of transactions where such unique identifiers are also used, such as from historical transactions or where the unique identifiers are pre-registered to be used for financial transactions. Such databases are therefore not necessarily kept by the identity verifier or within the identity verifier network. The results returned from the matching of the unique identifier of the electronic device of the requesting party against these databases are then processed to calculate a likelihood that the requesting party is genuine, i.e. the returned results are used to calculate a probability of an accuracy of the identity verification. For instance, if one or more of the databases has several records of the same electronic device being used to perform several approved transactions (i.e. these transactions are paired with the unique identifier of the requesting party's electronic device), this would increase the probability of the accuracy of the identity verification, as opposed to a scenario where only one database has records of approved transactions using the same electronic device.

In a second approach, the identity verifier determines whether confirmation is received that a payment event has taken place, where the payment event results in a cash flow transaction with a funds account that is linked to the party requesting for the financial service. This cash flow transaction causes movement of funds at the linked funds account, i.e. funds flow occurs with a designated account that is registered to the requesting party. The payment event is also specific, in that it is paired to the request for the financial service such that it is initiated whenever the financial service is requested and an acknowledgement of its completion, for example, from the party requesting the financial service, is required before provision of the financial service is approved.

During the request for the financial service, the requesting party provides identity data that is used by the identity server to determine a funds account that belongs to the requesting party. Typically, this funds account is pre-designated during registration for identity verification in accordance with the present disclosure; or may be a default funds account that is tied to the identity data of the requesting party. The identity verifier monitors for the receipt of data that verifies that the payment event has taken place, i.e. data that can evidence the successful completion of the payment event, such data being triggered due to a response provided by the requesting party. Upon receipt of such data, the identity verifier can then notify the financial service provider whether identity verification has been successfully established.

In one implementation of the second approach, the payment event is an amount of funds that the financial service provider deposits into the linked funds account, so that the cash flow transaction effected by the payment event leads to a flow of funds into the linked funds account. The data that verifies the payment event may then be an indication from the requesting party of the received funds. If the identity verifier determines a match between the received amount and the deposited amount, the identity verifier can then notify the financial service provider that identity verification has been successfully established.

In another implementation of the second approach, the identity verifier sends an invitation to the requesting party to pay a sum of funds. Thus, in the second approach, the cash flow transaction effected by the payment event leads to a flow of funds out of the linked funds account. The data that verifies the payment event is then an indication from the requesting party of the sum of the funds that is transferred out of the linked funds account. If the identity verifier determines that this sum has been paid, the identity verifier can then notify the financial service provider that identity verification has been successfully established.

It will be appreciated that both the first and the second approaches can be used separately or in conjunction in any order to perform identity verification. For instance, if the calculated probability of the accuracy of the identity verification from the first approach does not exceed a minimum threshold set by the financial service provider, the financial service provider then sends a signal to the identity verifier to undertake identity verification in accordance with the second approach.

The present disclosure therefore seeks to reduce fraudulent requests for financial services by providing a means to verify the identity of a party requesting for the financial service. Examples of financial services to which the present disclosure can be used include applying for a new credit card or for a bank loan. The information or data that is required to perform identity verification in accordance with the present disclosure also does not require the requesting party to submit any details further than what they would normally have to provide when applying for a new credit card or for a bank loan, thereby imposing no additional burden on the requesting party, yet providing an additional layer of security against fraud to the financial service provider. For instance, in the first approach, the identity verifier bases the identity verification analysis from past database transactions, which does not require any input from the requesting party.

TERMS DESCRIPTION (IN ADDITION TO DICTIONARY MEANING OF TERMS)

Identity verifier refers to one or more server computers configured to be able to communicate with one or more of: i) an electronic device that a party uses to request a financial service; ii) computer systems of the financial service provider; and iii) one or more databases containing records that the identity verifier requires to access to verify the identity of the requesting party. Accordingly, the identity verifier is equipped with the required computing protocol to communicate with the above devices, systems and databases.

Query information refers to a command that effects a sequence seeking to verify the identity of the requesting party (i.e. to confirm that the requesting party is indeed who they claim to be) and also includes data which is used to perform the identity verification. Such data includes, but is not limited to, details provided in fields of an application form for the financial service (such as contact details—name, address and telephone number—of the party requesting the financial service). The data also includes details of the requested financial service, such as a quantum if the requested financial service is a loan. The query information also includes data which is not specifically entered, but detected from the electronic device used to request the financial service, such as identification information of the electronic device.

Financial service includes, but is not limited to, banking related transactions, such as opening of a banking account; applying for a credit line or making a loan application.

Unique information refers to any data that allows the requesting party's electronic device to be pinpointed and differentiated from other electronic devices, such as any address data that allows location of the party's electronic device amongst other electronic devices that are connected to the Internet. Such data may be static, like an IMEI code (International Mobile Equipment Identity) of a telecommunication device; or dynamic, like an internet protocol (IP) address of a computer terminal, as assigned by an Internet Service Provider.

A linked funds account refers to a funds account that is registered to or belongs to the party requesting the financial service.

Verification of a payment event refers to seeking confirmation of successful completion of the payment event or seeking acknowledgement that the payment event has occurred.

EXEMPLARY EMBODIMENTS

Embodiments of the present invention will be described, by way of example only, with reference to the drawings. Like reference numerals and characters in the drawings refer to like elements or equivalents.

FIG. 1 shows a schematic of a system 100 which may be used to perform identity verification, in accordance with a first approach, of a party requesting a financial service. Broadly, in this first approach, identity verification is done by authenticating an electronic device 110 which is used to request the financial service.

The system 100 has an identity verifier 102, a financial service provider 120 and one or more databases 112 with which the identity verifier 102 communicates.

The identity verifier 102 may be implemented as one or more server terminals that work in tandem to perform identity verification. The identity verifier 102 is in electrical communication with the financial service provider 120 to receive data packets in support of the financial service request. The identity verifier 102 may for example be a switch that routes data packets in respect of financial transactions between acquirer and issuer entities of a financial network. Such a switch may, for example, belong to one of the several financial networks that the financial service provider 120 utilises in its capacity as an issuer or an acquirer. In addition, while FIG. 1 shows that the identity verifier is separate from the financial service provider 120, it is also possible to have a single server (not shown) integrate both the functions provided by the financial service provider 120 and the identity verifier 102. Another possible implementation has the financial service provider 120 and the identity verifier 102 in separate servers that belong to a system of servers that are owned by the same financial institution.

FIG. 1 shows an implementation where the identity verifier 102 directly communicates with the financial service provider 120, so that data from the electronic device 110 requesting the financial service is relayed through the financial service provider 120. An alternative implementation (not shown) has the electronic device 110 communicate directly with the identity verifier 102, whereby the identity verifier 102 then facilitates communication between the electronic device 110 and the financial service provider 120.

The financial service provider 120 refers to computer systems used by a financial institution that are utilised to support their provided one or more financial services, whereby the financial institution wants to verify the identity of the party before approving the party's requested financial service, so as to ensure that the financial institution is not a victim of fraud.

The one or more databases 112 store data which is used by the identity verifier 102 to perform the identity verification, such as historical transactions made by the party requesting the financial service from the financial service provider 120. In the case where the identity verifier 102 is realised by a switch of a financial network, one or more repositories which store records of financial transactions that the switch routes can serve as the one or more databases 112 of FIG. 1. Alternatively, a service provider may aggregate data from participating financial service provider 120 of past financial transaction data or customer data records, such participating financial service provider wishing to avail themselves to the identity verification service provided by the identity verifier 102. The data aggregator service provider periodically updates its databases to capture customer data record changes that happen at the participating financial service providers, and allows the identity verifier 102 to access its databases when performing identity verification.

The electronic device 110 may be any one or more of a smartphone or a computer terminal. The electronic device 110 need not necessarily require for a dedicated application to avail itself to the identity verification performed by identity verifier 102, as long as an identity of the electronic device 110 can be uniquely identified when it is used to request for a financial service from the financial service provider 120. For instance, requesting for the financial service through an Internet browser running on the electronic device 110 is sufficient for the identity verifier 102 to be able to uniquely identify the electronic device 110 through, for example, the identity verifier 102 extracting relevant details from data packet headers that originate from the electronic device 110.

One implementation of identity verification in accordance with the first approach is described below.

A party, who requests for a financial service from the financial service provider 120, uses their electronic device 110 to apply 106 for the requested financial service from the financial service provider 120. During this application stage, the party is asked to input information, such as personal particulars (name, address, occupation, account numbers which the party may have with the financial service provider 120), while the financial service provider 120 also receives other information which is not actively input by the requesting party. Such other information is sent by default, for instance packet header data, which contains details that can uniquely identify the electronic device 110 from other electronic devices. FIG. 1 shows that when requesting the financial service, the first point of contact for the electronic device 110 is the financial service provider 120. Alternatively, although not shown, the first point of contact for the electronic device 110 is the identity verifier 102, whereby the identity verifier 102 routes communication between the electronic device 110 and the financial service provider 120 during the application stage.

In the scenario where the party applies for the requested financial service in an offline manner, such as mailing an application form or physically at a cashier of the financial service provider 120, the contact details (such as mobile number or email address) of the party is sought, either in the application form or requested by the cashier. A link to a website is generated by the financial service provider 120, where the website is able to capture a unique identifier of an electronic device that visits the website. This link is sent to the contact details provided by the party, so that when the party visits the linked website using their electronic device 110, its unique identifier is captured.

Aspects of the information obtained during the application stage is provided to the identity verifier 102 as described below.

The identity verifier 102 receives 114, through its communication port 124, query information 116 to verify the identity provided by the party requesting the financial service from the financial service provider 120. FIG. 1 shows that the query information 116 is sent by the financial service provider 120. However, although not shown, the query information 116 can also be sent by the electronic device 110 in the alternative implementation where the electronic device 110 is in direct communication with the identity verifier 102.

Upon processing the query information 116, a processor 104 of the identity verifier 102 will realise that it is tasked to verify the identity of the party that is requesting the financial service from the financial service provider 120. The processor 104 is coupled to the communication port 124 and is also coupled to memory 108 which stores instructions specifying how identity verification is to be performed by the identity verifier 102.

As mentioned above, the query information 116 contains data that is used to perform this task, so that the identity verifier 102 extracts a unique identifier 118 of the electronic device 110 used to request the financial service from the financial service provider 120. In the case where the electronic device 110 is a smartphone, the unique identifier 118 is its IMEI code (International Mobile Equipment Identity). In the case where the electronic device 110 is a computing terminal, the unique identifier 118 may be its media access control (MAC) address or an internet protocol (IP) address assigned by an Internet service provider.

The identity verifier 102 interrogates 122 one or more databases 112 with the unique identifier 118, the one or more databases 112 storing data that is used to perform the identity verification. These one or more databases 112 store data of transactions where such unique identifiers are also used, such as from historical transactions or where the unique identifiers are pre-registered to be used for financial transactions. During this interrogation, the identity verifier 102 determines whether the one or more databases 112 contain a record of the unique identifier 118, such as the unique identifier 118 having been linked to past approved financial transactions, i.e. the one or more databases 112 contain past financial transactions indicating that the electronic device 110 was also used to perform these past financial transactions. The results of the interrogation are returned 123 to the identity verifier 102.

The interrogation results are used to calculate how probable the requesting party is indeed who they claim to be on the basis of whether there are records of the requesting party's electronic device 110 being contained in one or more databases 112 to which the identity verifier 102 has access, i.e. the processor 104 calculates a probability of an accuracy of the identity verification by at least determining whether one or more databases contain a record of the unique identifier 118. In one approach, the processor 104 calculates the probability through a summation of results returned from interrogating the one or more databases 112, the results indicating which of the one or more databases 112 contain a record of the unique identifier 118. For instance, six databases 112 may be interrogated, whereby the results indicate that only three of the databases 112 contain a record of the unique identifier 118. The results are then weighted, where the weight applied to each returned result is provided by the financial service provider 120 to which the database 112 serves to contain their past financial transactions. Alternatively, the identity verifier 102 determines each of these weights or applies a further weight in addition to the one provided by the respective financial service provider 120. In this manner, the existence of a record of the unique identifier 118 in certain databases 112 is considered to have more importance than the existence of a record of the same unique identifier 118 in other databases 112. The identity verifier 102 then responds 126 to the received query (i.e. from the identity verifier 102 receiving the query information 116) with the calculated probability 128. The financial service provider 120 then assesses whether the calculated probability 128 is within acceptable risk tolerance levels for the financial service provider 120 to approve the financial service request. The result of this assessment is conveyed 128 to the electronic device 110.

The unique identifier 118 being present in the records of the one or more databases 112 is a minimum parameter before the identity verifier 102 can calculate a score for the probability 128 of an accuracy of the identity verification. Further parameters that are used by the identity verifier 102 in the calculation of the score of this probability 128 include determining one or more of an interval between the receipt 114 of the query and a latest of the past approved financial transactions that are linked to the unique identifier 118; and a frequency of linkage of the past approved financial transactions to the unique identifier 118. The probability 128 score increases should the latest financial transaction be recent and should there be a frequent occurrence of historical financial transactions referencing the unique identifier 118.

An additional parameter is for one or more of the past approved financial transactions linked to the unique identifier 118 to be with a different financial institution. That is, the one or more databases 112 has records of the electronic device 110 being used to perform financial transactions funded by a different financial institution (e.g. a first financial transaction record lists bank A as the issuing bank while a second financial transaction record lists bank B as the issuing bank). This additional parameter may be given a higher percentage contribution to the probability 128 score compared to the contribution provided by the other parameters since the same electronic device 110 being used to perform financial transactions funded from different financial institutions would be a good indicator of a high degree of trust placed in use of the electronic device 110 for financial transactions, so that the identity of the requesting party is genuine.

One or more of these further and additional parameters may be utilised immediately with the minimum parameter of the unique identifier 118 being present in the records of the one or more databases 112 when the probability 128 score is first calculated, in response to risk tolerance levels that the financial service provider 120 communicates to the identity verifier 102. Alternatively, one or more of these further and additional parameters may be utilised with the minimum parameter only after the results of a probability 128 score is initially provided to the financial service provider 120, so that the identity verifier 102 can then calculate a revised probability 128 score for provision to the identity verifier 102. This alternative implementation occurs, for instance, when the financial service provider 120 assesses that the initially calculated probability 128 score is below a minimum threshold for the financial service provider 120 to approve the financial service request. The financial service provider 120 then commands for the identity verifier 102 to undertake identity verification again to calculate the revised probability 128 score.

Yet another parameter that the identity verifier 102 can use to calculate the probability of the accuracy of the identity verification is by further determining whether personal particulars associated with the unique identifier stored in the one or more databases 112 match personal particulars provided in the received query, as extracted from the query information 116. A match would increase the calculated probability 128 score.

The identity verifier 102 also facilitates the population of the one or more databases 112 with the data required to perform identity verification. This onboarding of data into the one or more databases 112 is described with reference to FIG. 2.

Figure 2:
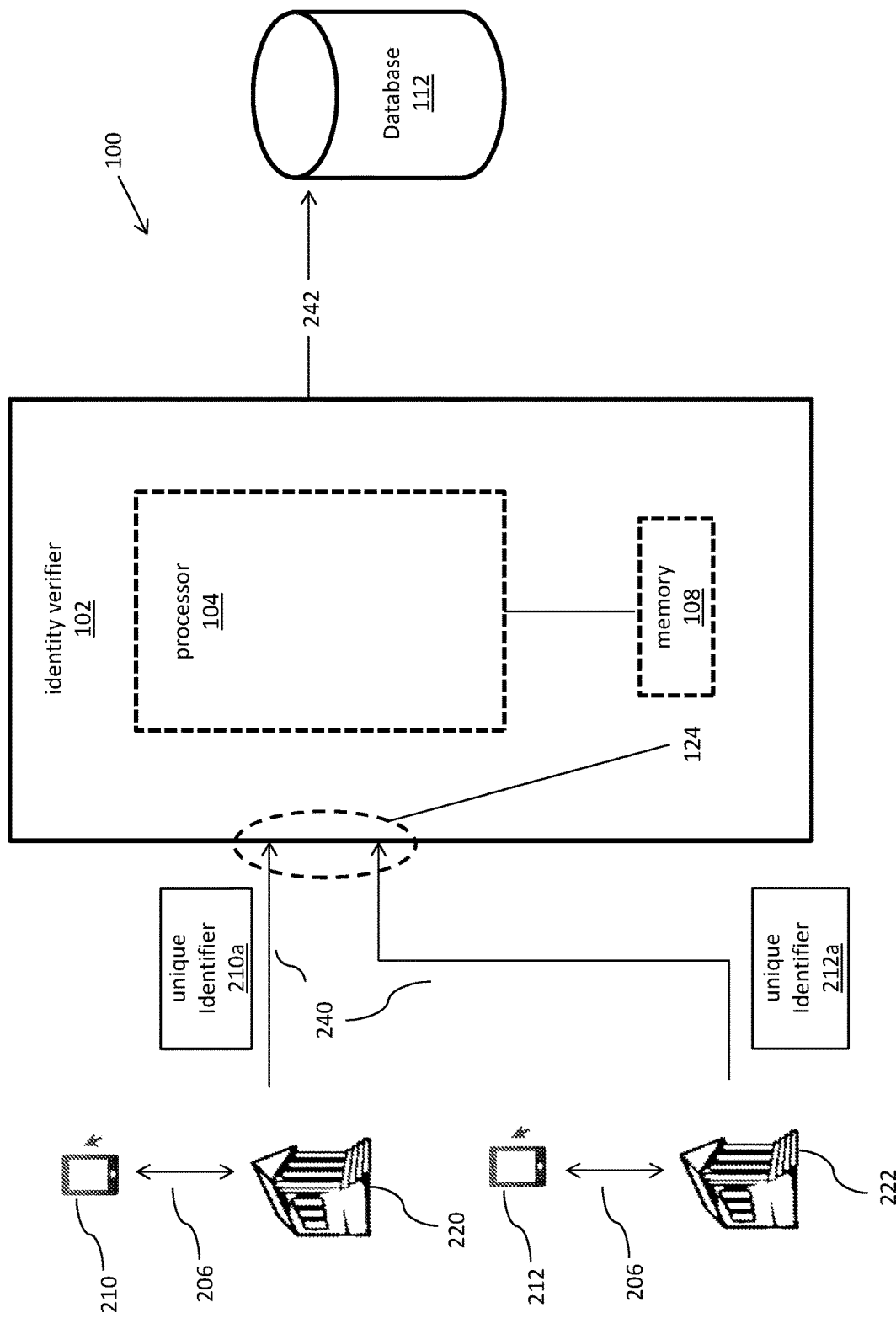
FIG. 2 shows a schematic of how the system of FIG. 1 onboards data required to perform identity verification into its one or more databases.

FIG. 2 shows a schematic of the system 100 of FIG. 1 where financial institutions 220, 222, along with electronic devices 210, 212, are included. The financial service provider 120 and the electronic device 110 are not shown for the sake of simplicity.

In FIG. 2, each of the one or more financial institutions 220, 222 is in communication 206 with a respective electronic device 210, 212. When a financial transaction initiated by the electronic devices 210, 212 with the respective one or more financial institutions 220, 222 is approved, the one or more financial institutions 220, 222 will have records of the unique identifiers 210a. 212a of the electronic devices 210, 212. These unique identifiers 210a. 212a are linked to the approved financial transaction with the respective financial institution 220, 222.

Conferring with FIG. 1, the onboarding of unique identifiers of electronic devices is done before the identity verifier 102 performs identity verification. In FIG. 2, this onboarding is done when the identity verifier 102 receives 240, through its communication port 124, the unique identifiers 210a. 212a of the electronic devices 210, 212 linked to approved financial transactions with the one or more financial institutions 220, 222. The identity verifier 102 then populates the one or more databases 112 with the received unique identifiers 210a, 212a.

Figure 3:
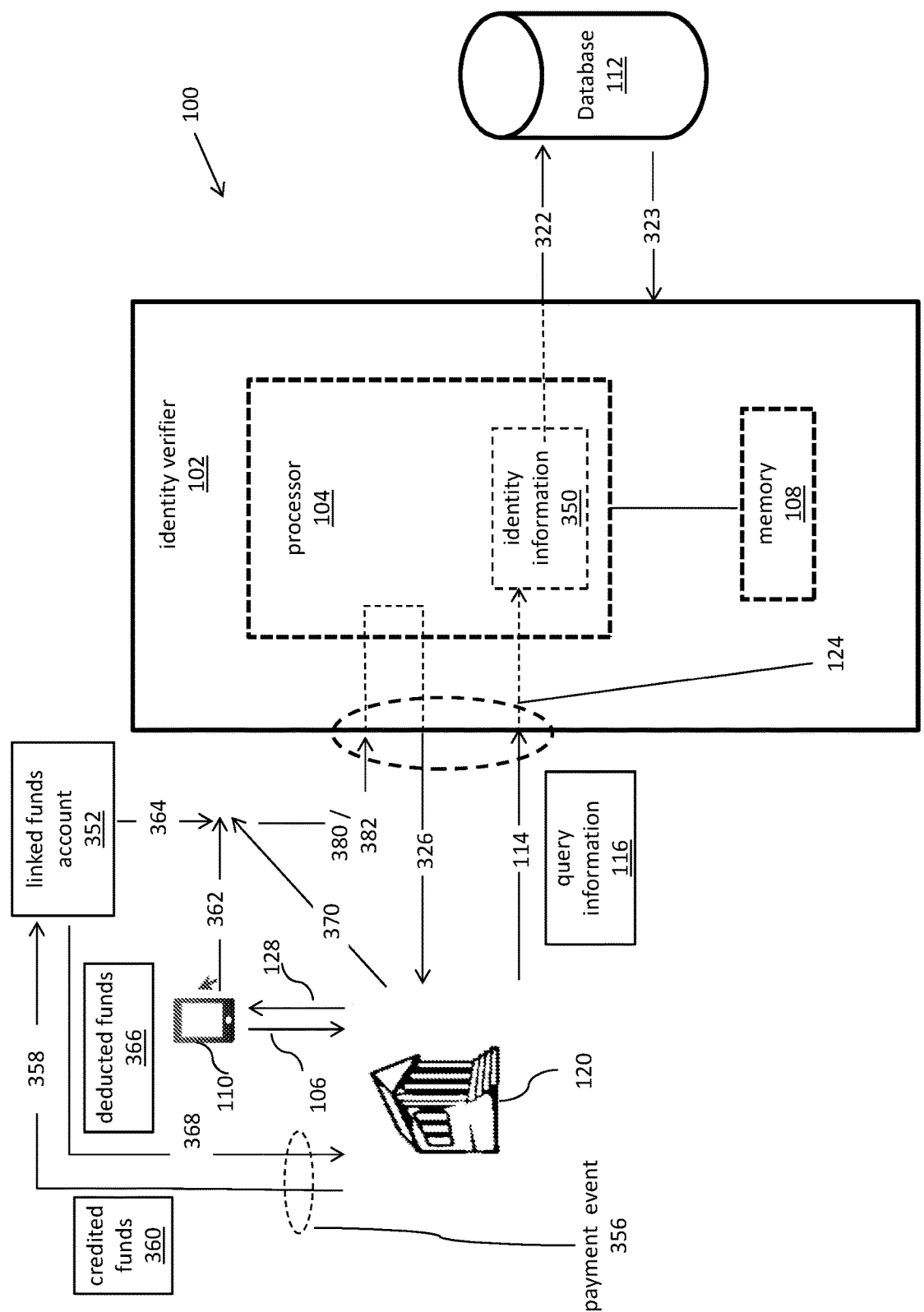
FIG. 3 shows a schematic of a system which may be used to perform identity verification, in accordance with a second approach, of a party requesting a financial service.

FIG. 3 shows a schematic of a system 100 which may be used to perform identity verification, in accordance with a second approach, of a party requesting a financial service. Broadly, in this second approach, identity verification is done by determining whether confirmation is received that a payment event has taken place, where the payment event results in a cash flow transaction with a funds account that is linked to the party requesting for the financial service.

The system 100 involves the same entities as that of the system 100 of FIG. 1, i.e. the identity verifier 102, the financial service provider 120 and the one or more databases 112.

One implementation of identity verification in accordance with the second approach is described below.

A party, who requests for a financial service from the financial service provider 120, uses their electronic device 110 to apply 106 for the requested financial service from the financial service provider 120. During this application stage, the party is asked to input information, such as personal particulars (name, address, occupation, account numbers which the party may have with the financial service provider 120). FIG. 1 shows that when requesting the financial service, the first point of contact for the electronic device 110 is the financial service provider 120. Alternatively, although not shown, the first point of contact for the electronic device 110 is the identity verifier 102, whereby the identity verifier 102 routes communication between the electronic device 110 and the financial service provider 120 during the application stage.

The identity verifier 102 receives 114, through its communication port 124, query information 116 to verify the identity provided by the party requesting the financial service from the financial service provider 120. FIG. 1 shows that the query information 116 is sent by the financial service provider 120. However, although not shown, the query information 116 can also be sent by the electronic device 110 in the alternative implementation where the electronic device 110 is in direct communication with the identity verifier 102.

Upon processing the query information 116, the processor 104 of the identity verifier 102 will realise that it is tasked to verify the identity of the party that is requesting the financial service from the financial service provider 120.

As mentioned above, the query information 116 contains data that is used to perform this task, so that the identity verifier 102 extracts identity information 350 from the query information 116, the identity information 350 providing the identity of the requesting party as input during the application stage. For example, the identity information 350 that is extracted from the identity information 350 includes the social security number of the requesting party.

The identity verifier 102 then determines a funds account 352 that is linked to the received identity (i.e. the identity information 350) from the query information 116. This determination of an account that belongs or is registered to the party requesting the financial service from the financial service provider 120 may be done, for example, from the account numbers provided by the requesting party during the application stage; or where the requesting party has already pre-registered a default account number that is associated with their identity. Alternatively, the determination may be done through sending 322 a command interrogating account records kept in the one or more databases 112 using the identity information 350 and analysing the results of the interrogation returned 323 from the one or more databases 112. A linked funds account 352 would then be an account record that matches or contain the identity information 350.

The identity verifier 102 then verifies a payment event 356 that results in a cash flow transaction 358, 368 with the linked funds account 352. The payment event 356 is a sequence of steps that occur which eventually results in a cash flow transaction with the linked funds account 352. As mentioned above, receipt of confirmation that the payment event 356 has taken place, with the involvement of the linked funds account 352, is required before the requested financial service from the financial service provider 120 is approved. That is, identity verification of the party requesting the financial service from the financial service provider 120 depends on the outcome of the payment event 356. The identity verifier 102 provides the outcome of the payment event 356 to the financial service provider 120 by replying 326 to the query (i.e. from the identity verifier 102 receiving 114 the query information 116) with data based on the verification of the payment event 356.

In a first implementation, an amount of funds 360 (for example, between $0.01 and $5.00) is credited into the linked funds account 352. While FIG. 3 shows that the credited funds 360 is paid for by the financial service provider 120 (as symbolized by the arrow labelled 358), this is not necessarily the case, since the credited funds 360 can come from another channel, whereby the financial institution managing the linked funds account 352 is notified of the amount of the credited funds 360 for verification purposes.

The identity verifier 102 facilitates this crediting of the funds 360 by sending a command to the financial service provider 120 or another financial institution (not shown) to effect this credited funds 360 flow. Accordingly, in this first implementation, a first step of the verification of the payment event 356 has the identity verifier 102 generate the payment event 356 by facilitating crediting of funds into the linked funds account 352.

A second step of the verification of the payment event 356 has the identity verifier 102 monitor the communication port 124 for an acknowledgement 380 of the receipt of the credited funds 360 into the linked funds account 352. The acknowledgement 380 may be sent 362 by the electronic device 110, such as by the requesting party sending a communication to the identity verifier 102 stating the amount of the credited funds 360 during or after the application stage. Alternatively, the financial institution managing the linked funds account 352 sends 364 a suitable notification to the identity verifier 102. The data based on the verification of the payment event 356, which the identity verifier 102 provides to the financial service provider 120, in the reply 326 includes an indication of the receipt of the credited funds 360 into the linked funds account 352.

In a second implementation, an amount of funds 366 (for example, between $0.01 and $5.00) is deducted from the linked funds account 352. While FIG. 3 shows that the deducted funds 366 is sent 368 to the financial service provider 120, this is not necessarily the case, since the deducted funds 366 can alternatively be sent to other channels. The identity verifier 102 facilitates this deduction by sending a request for a sum of funds to be deducted from the linked funds account 352. In one approach, the request is sent to the electronic device 110, for example by SMS to a phone number registered to the requesting party; or to an email address that belongs to the requesting party. In another approach, the identity verifier 102 provides a website address configured to host the request for the deducted funds 366.

Accordingly, in this second implementation, a first step of the verification of the payment event 356 has the identity verifier 102 request for a sum of funds 366 to be deducted from the linked funds account 352.

A second step of the verification of the payment event 356 has the identity verifier 102 monitor the communication port 124 for confirmation 382 of the deduction of the funds 366 from the linked funds account 352. The confirmation 382 may be sent 362 by the electronic device 110, such as by the electronic device 110 sending an indication that the request for the funds to be paid is met. Alternatively, the financial service provider 120 sends 370 to the identity verifier 102 a message indicating receipt of the deducted funds 366.

In both the first and the second implementations, the identity verifier 102 notifies the electronic device 110 of the payment event 356, so that the requesting party will be made aware that they need to provide an acknowledgement of credited funds 360 into their linked funds account 352; or effect a deduction of funds 366 before their requested financial service from the financial service provider 120 is approved.

The crediting of the funds 360 and the deduction of the funds 366 are configured to be reversed after a specific time interval, since their purpose is a means to perform identity verification. Accordingly, the identity verifier 102 is configured to reinstate the funds in respect of the cash flow transaction after identity verification of the party requesting the financial service is completed.

Figure 4:
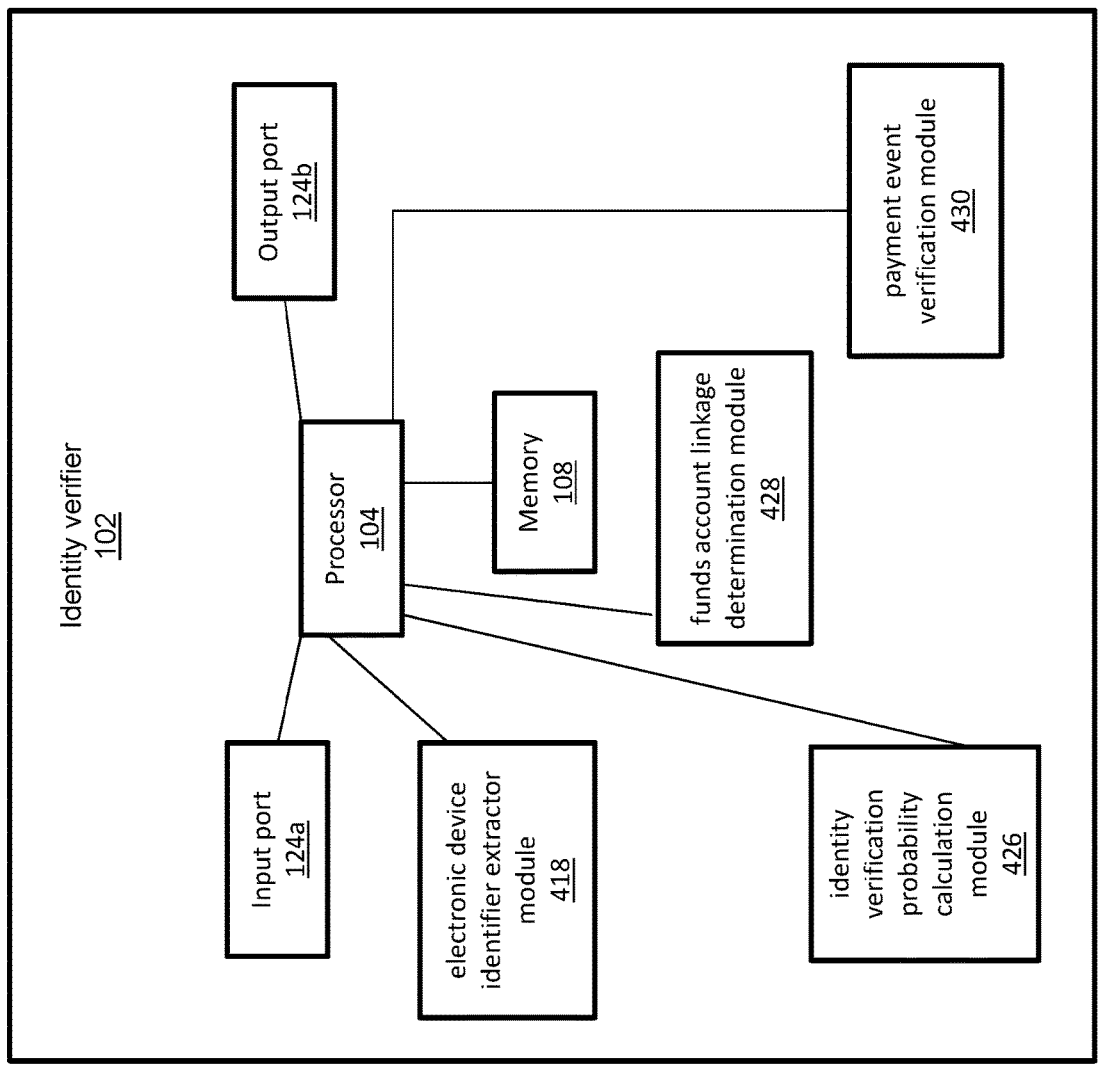
FIG. 4 provides a schematic diagram of functional modules present in the identity verifier 102 of FIGS. 1, 2 and 3

FIG. 4 provides a schematic diagram of functional modules present in the identity verifier 102 of FIGS. 1, 2 and 3.

As mentioned above, the identity verifier 102 includes a processor 104 and a memory 108. The identity verifier 102 further comprises, an input port 124a, an output port 124b, an electronic device identifier extractor module 418, an identity verification probability calculation module 426, a funds account linkage determination module 428 and a payment event verification module 430.

Each of the memory 160, the input port 124a, the output port 124b, the electronic device identifier extractor module 418, the identity verification probability calculation module 426, the funds account linkage determination module 428 and the payment event verification module 430 is coupled to the processor 104, so that their respective operations can be controlled by the processor 104. The memory 108 stores computer program code that the processor 104 compiles to have each of the electronic device identifier extractor module 418, the identity verification probability calculation module 426, the funds account linkage determination module 428 and the payment event verification module 430 perform their respective functions.

Each of the input port 124a, the output port 124b, the electronic device identifier extractor module 418, the identity verification probability calculation module 426, the funds account linkage determination module 428 and the payment event verification module 430 can be implemented using one or more processors present in the identity verifier 102.

With reference to FIGS. 1 and 3, the communication port 124 of the identity verifier 102 is realised by the input port 124a and the output port 124b of FIG. 4. The input port 124a is configured to receive input, such as the query information 116; data received from the one or more databases 112; and the status of the payment event 356. The output port 124b is configured to send output, such as data to the one or more databases 112; and messages to the financial service provider 120, such as the calculated probability of an accuracy of an identity verification and data indicative of verification of the payment event 356.

The electronic device identifier extractor module 418 is configured to detect for presence of a unique identifier 118 of the electronic device 110 within the query information 116 and extract the unique identifier 118 from the query information 116.

The identity verification probability calculation module 426 is configured to calculate a probability of an accuracy of identity verification from data retrieved from the one or more databases 112, such as whether the one or more databases 112 contains a record of the unique identifier 118 of the electronic device 110 used to request a financial service from the financial service provider 120. Upon calculation of a probability 128 score, the score is then provided to the output port 124b for transmission to the financial service provider 120

The funds account linkage determination module 428 is configured to uncover what funds are linked to the party requesting the financial service from the financial service provider 120 and then determine one of the accounts is to be used as a source of funds or recipient of funds for the payment event 356.

The payment event verification module 430 is configured to monitor for a notification that the payment event 356 has taken place and then provide the output port 124b with an indication as to whether the cashflow transaction, effected by the payment event 356, has occurred with the linked funds account 352.

Figure 5:
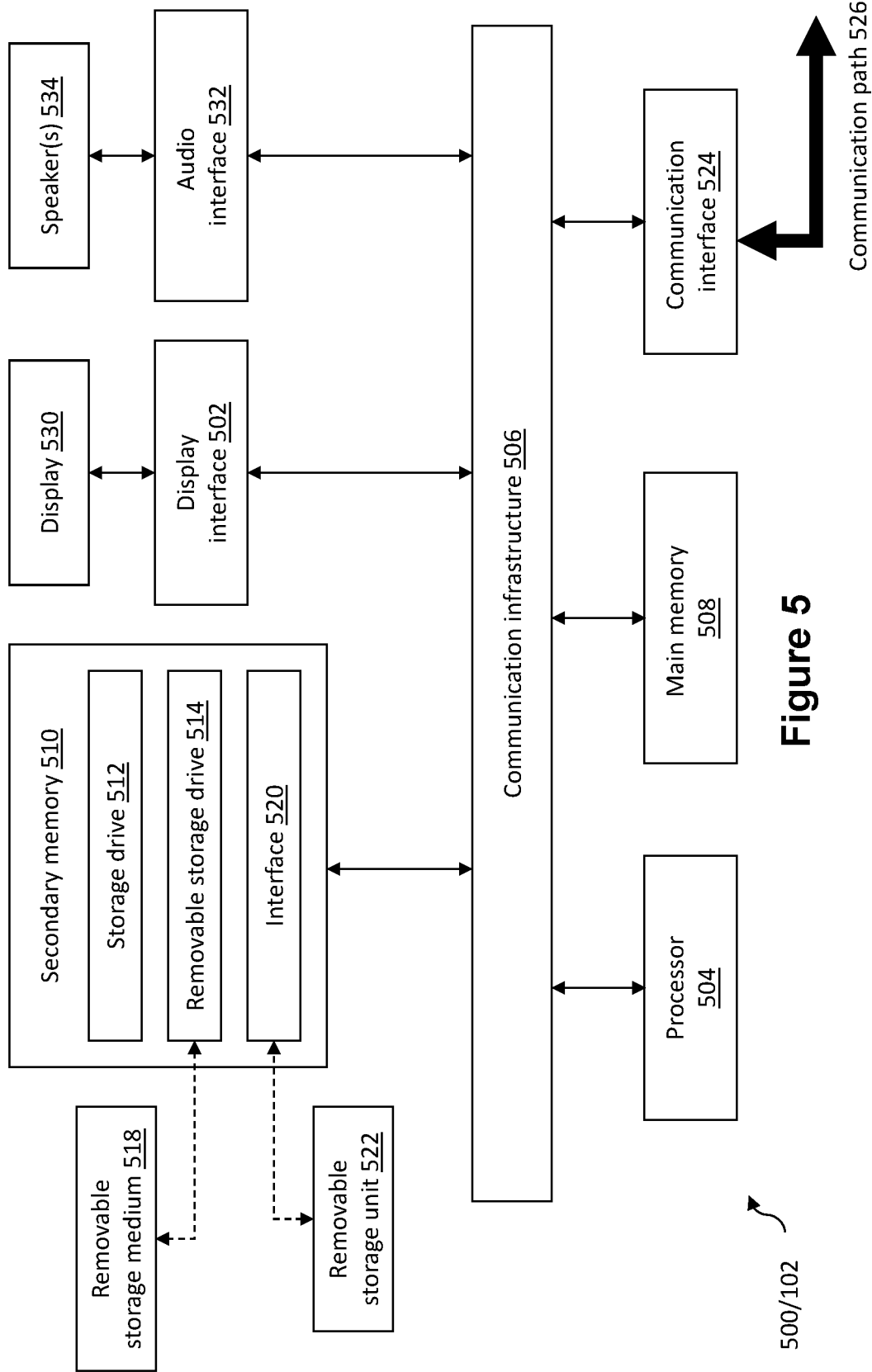
FIG. 5 shows a schematic of a computing device used to realise the identity verifier shown in FIGS. 1, 2 and 3.

FIG. 5 depicts an exemplary computing device 500, hereinafter interchangeably referred to as a computer system 500, where one or more such computing devices 500 may be used to implement the identity verifier 102 shown in FIGS. 1A, 1B and 2. The following description of the computing device 500 is provided by way of example only and is not intended to be limiting.

As shown in FIG. 5, the example computing device 500 includes a processor 504 for executing software routines. Although a single processor is shown for the sake of clarity, the computing device 500 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a storage drive 512, which may be a hard disk drive, a solid state drive or a hybrid drive and/or a removable storage drive 514, which may include a magnetic tape drive, an optical disk drive, a solid state storage drive (such as a USB flash drive, a flash memory device, a solid state drive or a memory card), or the like. The removable storage drive 514 reads from and/or writes to a removable storage medium 518 in a well-known manner. The removable storage medium 518 may include magnetic tape, optical disk, non-volatile memory storage medium, or the like, which is read by and written to by removable storage drive 514. As will be appreciated by persons skilled in the relevant art(s), the removable storage medium 518 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 520. Examples of a removable storage unit 522 and interface 520 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 520 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the inventions, the communication interface 524 permits data to be transferred between the computing device 500 and a data communication network, such as a public data or private data communication network. The communication interface 524 may be used to exchange data between different computing devices 500 which such computing devices 500 form part an interconnected computer network. Examples of a communication interface 524 can include a modem, a network interface (such as an Ethernet card), a communication port (such as a serial, parallel, printer, GPIB, IEEE 1394, RJ45, USB), an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage medium 544, removable storage unit 522, a hard disk installed in storage drive 512, or a carrier wave carrying software over communication path 526 (wireless link or cable) to communication interface 524. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the storage drive 512, or the interface 520. The computer program product may be a non-transitory computer readable medium. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts. The main memory 508 and/or the secondary memory 510 may serve(s) as the memory for the identity verifier 102; while the processor 504 may serve as the processor of the identity verifier 102.

In the first approach described with respect to FIG. 1, the memory (510, 518) contains computer program code, where the memory (510, 518) and the computer program code are configured to, with the processor 504, cause the computing device 500 at least to: receive, through the communication port (via the communication interface 524), query information to verify an identity provided by a party requesting a financial service (such as a user of the electronic device 110); extract a unique identifier of an electronic device (confer the electronic device 110) from the query information, the electronic device 110 used to request the financial service; calculate a probability of an accuracy of the identity verification by at least determining whether one or more databases 112 contain a record of the unique identifier, the one or more databases 112 storing data used to perform the identity verification; and respond, through the communication port, to the query with the calculated probability.

The computing device 500 is further configured to calculate the probability of the identity verification by further determining whether the one or more databases 112 contain records of the unique identifier being linked to past approved financial transactions.

The computing device 500 is further configured to calculate the probability of the identity verification by further determining one or more of an interval between the receipt of the query and a latest of the past approved financial transactions; and a frequency of linkage of the past approved financial transactions to the unique identifier. In one implementation, one or more of the past approved financial transactions is with a different financial institution.

The computing device 500 is further configured to receive, through the communication port, unique identifiers of electronic devices linked to approved financial transactions with one or more financial institutions; and populate the one or more databases with the received unique identifiers.

The computing device 500 is further configured to calculate the probability of the accuracy of the identity verification by further determining whether personal particulars associated with the unique identifier stored in the one or more databases match personal particulars provided in the received query.

The unique identifier comprises any one of the following: media access control (MAC) address; IMEI code (International Mobile Equipment Identity) of a telecommunication device; and internet protocol (IP) address of a computer terminal.

In the second approach described with respect to FIG. 3, the memory (510, 518) contains computer program code, where the memory (510, 518) and the computer program code are configured to, with the processor 504, cause the computing device 500 at least to: receive, through the communication port (via the communication interface 524), query information to verify an identity provided by a party requesting a financial service (such as a user of the electronic device 110); determine a funds account 352 linked to the received identity from the query information; verify a payment event that results in occurrence of a cash flow transaction with the linked funds account 352; and reply, through the communication port, to the query with data based on the verification of the payment event.

The computing device 500 is further configured to notify an electronic device 110 used to request the financial service about the payment event.

The computing device 500 is further configured to, during verification of the payment event: generate the payment event by facilitating crediting of funds 360 into the linked funds account 352, and monitor the communication port for an acknowledgement of the receipt of the credited funds 360 into the linked funds account 352, wherein the data based on the verification of the payment event comprises an indication of the receipt of the credited funds 360 into the linked funds account 352.

The computing device 500 is further configured to, during verification of the payment event: request for a sum of funds 366 to be deducted from the linked funds account; and monitor the communication port for confirmation of the deducted funds 366 from the linked funds account 352, wherein the data based on the verification of the payment event comprises an indication of the receipt of the confirmation of the deducted funds 366 from the linked funds account 352.

The computing device 500 is further configured to, during the request for the sum of funds: provide a website address configured to host the request for the deducted funds.

The computing device 500 is further configured to reinstate funds in respect of the cash flow transaction after identity verification of the party requesting the financial service is completed.

Figure 6:
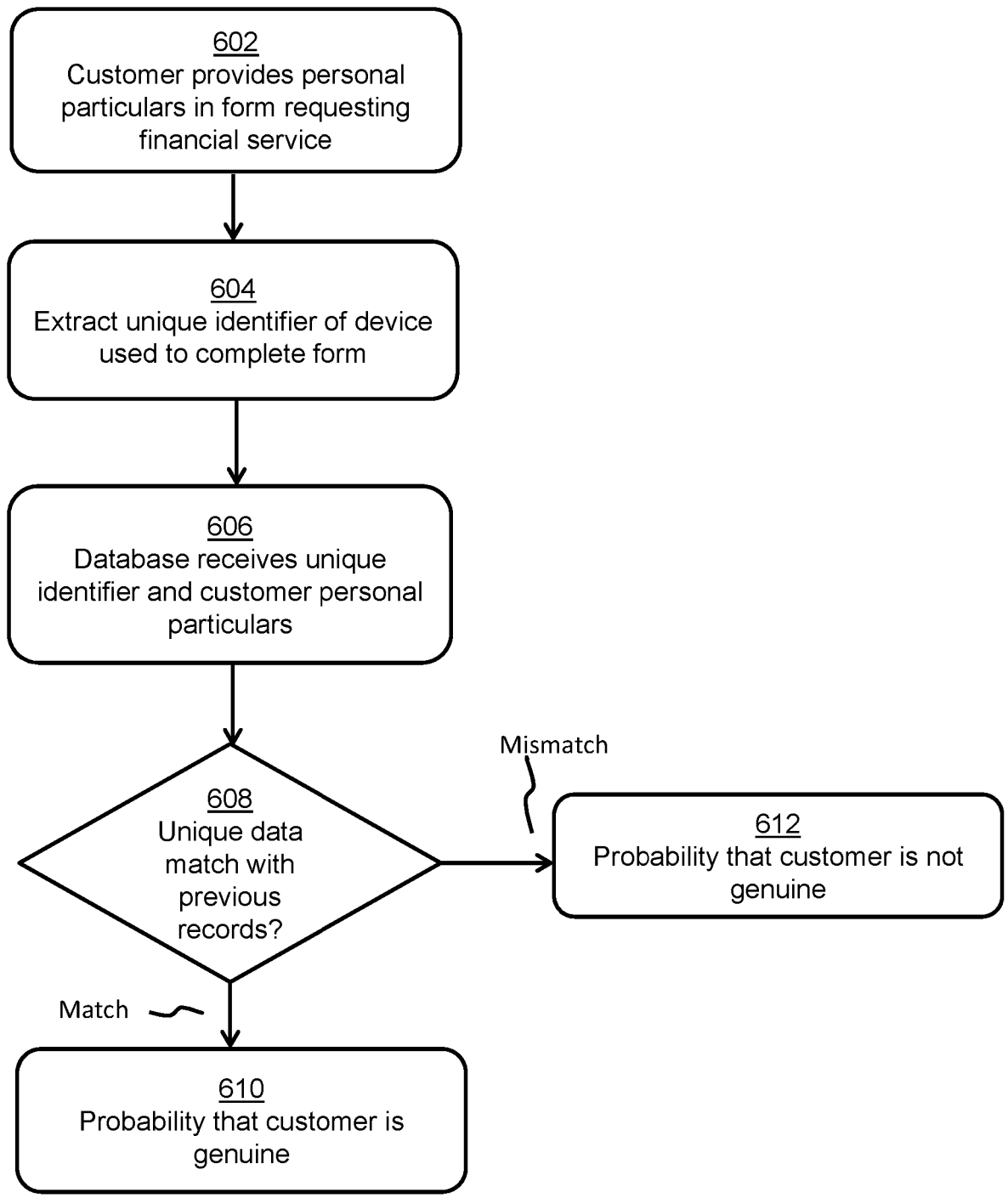
FIG. 6 shows a flowchart depicting steps of a method used to perform identity verification in accordance with one implementation of the first approach.

FIG. 6 shows a flowchart depicting steps of a method 600 used to perform identity verification in accordance with one implementation of the first approach described above. Portions of the method 600 is performed by the identity verifier 102/computing device 500 of FIG. 5.

In step 602, a customer completes an application form for a financial service from a financial service provider (confer financial service provider 120 of FIG. 1). The customer provides personal particulars (such as contact details—name, address and telephone number; and a social security number) in the application form. The application form is in electronic form, which the customer accesses and completes using an electronic device (such as a computer terminal or a smartphone).

In step 604, the identity verifier 102 receives the application form data and extracts the identification information of the electronic device used to complete the application form. The identification information of the electronic device includes a unique identifier of the electronic device, such as the IMEI code, a media access control (MAC) address or an internet protocol (IP) address. Alternatively, a server terminal that hosts the application form can extract the identification information of the electronic device and forward it to the identity verifier 102 in step 604.

The identity verifier 102 transmits the extracted unique identifier to one or more databases, having records of past financial transactions and an identifier of the electronic devices on which they were performed, for verification. The customer personal particulars are also sent in addition to the extracted unique identifier of the electronic device used by the customer. In step 606, the one or more databases receives the extracted unique identifier and the customer personal particulars.

In step 608, the one or more databases determine whether the extracted unique identifier matches with unique identifier records from past financial transactions, in respect of the customer personal particulars. This may be done, for example, by determining whether the one or more databases contain records of the unique identifier being linked to past approved financial transactions. The one or more databases return the result of the determination to the identity verifier 102. The identity verifier 102 compiles the results returned from all of the databases. If it is an overall match, the identity verifier 102 will respond, in step 610, to the financial service provider with a probability score indicative that the customer has likely provided a genuine identity. If it is an overall mismatch, the identity verifier 102 will respond, in step 620, to the financial service provider with a probability score indicative that the customer has provided an identity that is likely not genuine. The identity verifier 102 may also include one or more of the following parameters when calculating the probability score: an interval between the receipt of the query and a latest of the past approved financial transactions; a frequency of linkage of the past approved financial transactions to the unique identifier; whether one or more of the past approved financial transactions is with a different financial institution; and whether personal particulars associated with the unique identifier stored in the one or more databases match personal particulars provided in the received query.

Figure 7:
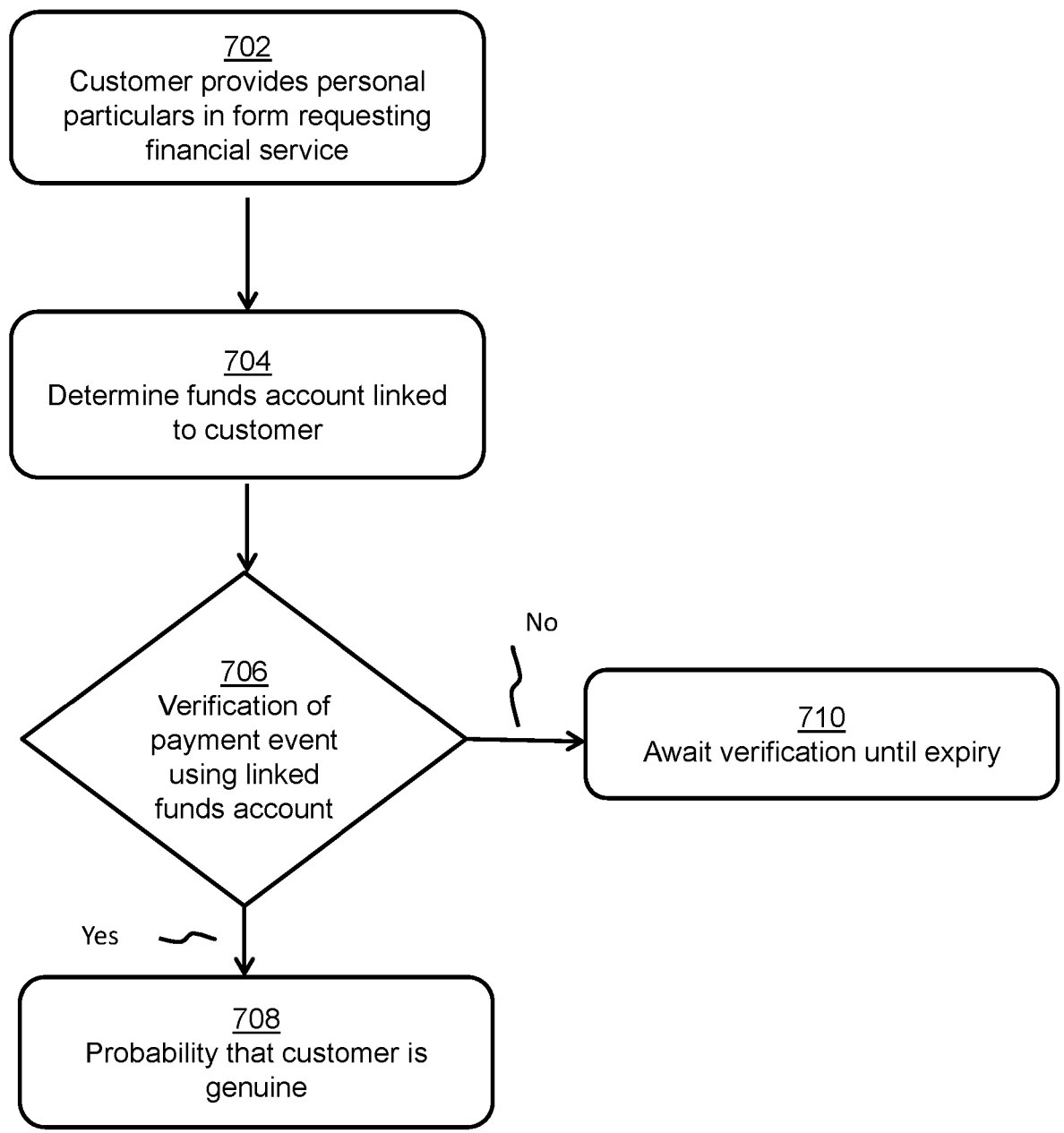
FIG. 7 shows a flowchart depicting steps of a method used to perform identity verification in accordance with one implementation of a second approach.

FIG. 7 shows a flowchart depicting steps of a method 700 used to perform identity verification in accordance with one implementation of the second approach described above. Portions of the method 700 is performed by the identity verifier 102/computing device 500 of FIG. 5.

In step 702, a customer completes an application form for a financial service from a financial service provider (confer financial service provider 120 of FIG. 1). The customer provides personal particulars (such as contact details—name, address and telephone number; and a social security number) in the application form. The application form is in electronic form, which the customer accesses and completes using an electronic device (such as a computer terminal or a smartphone).

In step 704, the identity verifier 102 receives the application form data and determines a funds account that is linked to the received identity of the customer. This determination of an account that belongs or is registered to the customer may be done, for example, from account numbers provided by the requesting party provided in the application form; or where the customer has already pre-registered a default account number that is associated with their identity.

In step 706, the identity verifier 102 waits for verification of the occurrence of a payment event that results in a cash flow transaction with the linked funds account. In one implementation, the payment event has funds credited into the linked funds account, whereby the identity verifier 102 receives the verification of occurrence of the payment event from the customer stating the amount of credited funds in the application form. In another implementation, the payment event has funds debited from the linked funds account, whereby the identity verifier 102 receives the verification of occurrence of the payment event from a notification transmitted by a financial institution to which the linked funds account belongs. The identity verifier 102 may notify the electronic device used to request the financial service about the payment event. The identity verifier 102 may also provide a website address configured to host the request for the deducted funds.

In step 708, the identity verifier 102 informs the financial service provider upon verification of the payment event. The identity verifier 102 may then reinstate funds in respect of the cash flow transaction after identity verification of the party requesting the financial service is completed. Otherwise, the identity verifier 102 awaits, in step 710, for verification of the payment event until an expiry period.

Some portions of the above description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on a computer effectively results in an apparatus that implements the steps of the preferred method.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An identity verifier comprising:
   at least one processor;

at least one memory including computer program code; and a communication port coupled to the processor, wherein the computer program code includes instructions that, when executed by the at least one processor, cause the at least one processor to:

receive, through the communication port from a financial service provider server, a query including query information to verify an identity provided by a party requesting a new financial service, the query information including details provided in a financial service application request form for the new financial service by the party, wherein the new financial service includes at least one of opening a new bank account, applying for a new credit line, or making an application for a new loan;

extract first personal particulars from the query information, wherein the first personal particulars include a first name, first contact information, and a first account number of the party;

send a link, generated by the financial service provider server, to the first contact information of the party requesting the new financial service, wherein the link directs to a website;

automatically extract, based on the party visiting the website using an electronic device via the link, a unique identifier of the electronic device;

based on the unique identifier of the electronic device, access second personal particulars stored in a plurality of databases, the second personal particulars including a second name, second contact information, and a second account number of the party, each of the plurality of databases being associated with a separate financial service provider;

determine whether the first personal particulars, extracted from the query information in the financial service application request form requesting the new financial service, match the second personal particulars accessed based on the unique identifier;

aggregate information from the plurality of databases, each of the plurality of databases including customer data records and past approved financial transactions from the separate financial service provider;

determine whether the aggregated information from the plurality of databases contains a record of the unique identifier, wherein the record of the unique identifier includes an indication of the unique identifier being linked to past approved financial transactions;

assign a weight to a result of the determination whether the aggregated information from the plurality of databases contains the record of the unique identifier;

calculate a probability of a verification of the identity based at least on the weighted result and the determination whether the first personal particulars extracted from the query information match the second personal particulars associated with the unique identifier; and respond, through the communication port to the financial service provider server, to the query with the calculated probability, wherein the new financial service is granted to the party based at least on the calculated probability.

2. The identity verifier of claim 1, wherein the financial service provider server is configured to grant the new financial service to the party based on the calculated probability.

3. The identity verifier of claim 1, wherein the computer program code further includes instructions that, when executed by the at least one processor, further cause the at least one processor to calculate the probability of the verification of the identity by determining one or more of:

an interval between receiving the query and a latest of the past approved financial transactions; and a frequency of linkage of the past approved financial transactions to the unique identifier, wherein both i) a reduction of the interval between receiving the query and the latest of the past approved financial transactions, and ii) an increase in the frequency of the linkage of the past approved financial transactions to the unique identifier increases the calculated probability of the verification of the identity.

4. The identity verifier of claim 1, wherein the computer program code further includes instructions that, when executed by the at least one processor, further cause the at least one processor to:

increase the probability of the verification of the identity at least by determining that more than one database of the plurality of databases contains the record of the unique identifier, the more than one database corresponding to a financial institution separate from an institution corresponding to the financial services provider server.

5. The identity verifier of claim 1, wherein the computer program code further includes instructions that, when executed by the at least one processor, further cause the at least one processor to:

receive, through the communication port, unique identifiers of electronic devices linked to approved financial transactions with one or more financial institutions; and populate the plurality of databases with the received unique identifiers.

6. The identity verifier of claim 1, wherein the computer program code further includes instructions that, when executed by the at least one processor, further cause the at least one processor to:

assign a second weight to each of the plurality of databases, wherein a database of the plurality of databases that contains a record of the unique identifier is weighted higher than a database of the plurality of databases that does not contain the record, and calculate the probability of the verification of the identity by determining that the second personal particulars associated with the unique identifier stored in the plurality of databases with a highest weight of the assigned second weight match the first personal particulars provided in the received query.

7. The identity verifier of claim 1, wherein:

the unique identifier comprises any one of the following: media access control (MAC) address; IMEI code (International Mobile Equipment Identity) of a telecommunication device; and internet protocol (IP) address of a computer terminal, and the weight assigned to the result of the determination that the aggregated information from the plurality of databases contains the record of the unique identifier is provided by the financial service provider server.

8. A system for verifying an identity, the system comprising:

a financial service provider server configured to generate a link to be sent to a party requesting a new financial service, wherein the link directs to a website; and an identity verifier comprising:

at least one processor;

at least one memory including computer program code; and a communication port coupled to the processor;

wherein the computer program code includes instructions that, when executed by the at least one processor, cause the at least one processor to:
- receive, through the communication port from the financial service provider server, a query including query information to verify the identity provided by a party requesting a new financial service, the query information including details provided in a financial service application request form for the new financial service by the party, wherein the new financial service includes at least one of opening a new bank account, applying for a new credit line, or making an application for a new loan;
- extract first personal particulars from the query information, wherein the first personal particulars include a first name, first contact information, and a first account number of the party, and wherein the generated link is sent to the first contact information of the party requesting the new financial service;
- determine a funds account linked to the identity from the query information;
- automatically extract, based on the party visiting the website using an electronic device via the link, a unique identifier of the electronic device;
- based on the unique identifier of the electronic device, access second personal particulars stored in a plurality of databases, the second personal particulars including a second name, second contact information, and a second account number of the party, each of the plurality of databases being associated with a separate financial service provider;
- determine whether the first personal particulars, extracted from the query information provided by the party requesting the new financial service, match the second personal particulars accessed based on the unique identifier;
- make a deposit into the funds account associated with the extracted unique identifier and identity from the query information;
- verify, after making the deposit, a payment event, comprising the deposit from the financial service provider server to the funds account, that results in occurrence of a cash flow transaction with the linked funds account, wherein verifying the payment event includes receiving an acknowledgement of the deposit to the funds account from at least one of the electronic device or the financial service provider server;
- calculate, after verifying the payment event, a probability of the verification of the identity associated with the funds account based at least on the determination that the first personal particulars extracted from the query information match the second personal particulars associated with the unique identifier; and
- transmit, through the communication port to the financial service provider server, a response to the query with data based on the verification of the payment event and the calculated probability, wherein the financial service provider server is configured to:
- receive the response to the query including the verification of the payment event, and
- based on the received response, process the cash flow transaction with the linked funds account.

9. The system of claim 8, wherein the computer program code further includes instructions that, when executed by the at least one processor, further cause the at least one processor to notify an electronic device used to request the new financial service about the payment event, and
wherein the financial service provider server is configured to:
- receive the response to the query including the verification of the payment event, and
- based on the received response, process the cash flow transaction with the linked funds account.

10. The system of claim 8, wherein the computer program code further includes instructions that, when executed by the at least one processor, further cause the at least one processor to, during verification of the payment event:
- generate the payment event by facilitating crediting of funds into the linked funds account, and
- monitor the communication port for an acknowledgement of receiving the credited funds into the linked funds account, wherein the data based on the verification of the payment event comprises an indication of receiving the credited funds into the linked funds account.

11. The system of claim 8, wherein the computer program code further includes instructions that, when executed by the at least one processor, further cause the at least one processor to, during verification of the payment event:
- request for a sum of funds to be deducted from the linked funds account; and
- monitor the communication port for confirmation of the deducted funds from the linked funds account, wherein the data based on the verification of the payment event comprises an indication of receiving the confirmation of the deducted funds from the linked funds account.

12. The system of claim 11, wherein the computer program code further includes instructions that, when executed by the at least one processor, further cause the at least one processor to, during the request for the sum of funds:
- provide a website address configured to host the request for the deducted funds.

13. The system of claim 8, wherein the computer program code further includes instructions that, when executed by the at least one processor, further cause the at least one processor to reinstate funds in respect of the cash flow transaction after identity verification of the party requesting the new financial service is completed.

14. An identity verification method comprising:
- receiving a query from a financial service provider server, the query including query information to verify an identity provided by a party requesting a new financial service, the query information including details provided in a financial service application request form for the new financial service by the party, wherein the new financial service includes at least one of opening a new bank account, applying for a new credit line, or making an application for a new loan;
- extracting first personal particulars from the query information, wherein the first personal particulars include a first name, first contact information, and a first account number of the party;
- sending a link, generated by the financial service provider server, to the first contact information of the party requesting the new financial service, wherein the link directs to a web site;

automatically extracting, based on the party visiting the website using an electronic device via the link, a unique identifier of an electronic device;

based on the unique identifier of the electronic device, accessing second personal particulars stored in a plurality of databases, wherein the second personal particulars include a second name, second contact information, and a second account number of the party, each of the plurality of databases being associated with a separate financial service provider determining whether the first personal particulars, extracted from the query information in the application request form for the new financial service, match the second personal particulars accessed based on the unique identifier;

aggregating information from the plurality of databases, each of the plurality of databases including customer data records and past approved financial transactions from the separate financial service provider;

determining whether the aggregated information from the plurality of databases contains a record of the unique identifier, wherein the record of the unique identifier includes an indication of the unique identifier being linked to past approved financial transactions;

assigning a weight to a result of the determination whether the aggregated information from the plurality of databases contains the record of the unique identifier;

calculating a probability of a verification of the identity based at least on the weighted result and the determination whether the first personal particulars extracted from the query information match the second personal particulars associated with the unique identifier; and responding to the query with the calculated probability, wherein, based on the response to the query, the financial service provider server grants the new financial service to the party based on the calculated probability, and processes a cash flow transaction.

15. The identity verification method of claim 14, wherein calculating the probability of the verification of the identity comprises determining that the plurality of databases contains records of the unique identifier being linked to past approved financial transactions.

16. The identity verification method of claim 14, wherein calculating the probability of the verification of the identity comprises determining one or more of:
   an interval between receiving the query and a latest of the past approved financial transactions; and
   a frequency of linkage of the past approved financial transactions to the unique identifier.

17. The identity verification method of claim 14, further comprising:
   determining a funds account linked to the verification of the identity from the query information;
   verifying a payment event that results in occurrence of a cash flow transaction with the linked funds account; and
   replying to the query with data based on the verification of the payment event.

18. The identity verification method of claim 17, further comprising:
   generating the payment event by facilitating crediting of funds into the linked funds account, and
   monitoring for an acknowledgement of receiving the credited funds into the linked funds account, wherein the data based on the verification of the payment event comprises an indication of receiving the credited funds into the linked funds account.

19. The identity verification method of claim 17, further comprising:
   requesting for a sum of funds to be deducted from the linked funds account; and
   monitoring for confirmation of the deducted funds from the linked funds account, wherein the data based on the verification of the payment event comprises an indication of receiving the confirmation of the deducted funds from the linked funds account.

20. The identity verification method of claim 17, further comprising:
   reinstating funds in respect of the cash flow transaction after identity verification of the party requesting the new financial service is completed.

* * * * *